May 28, 1940.    S. B. NEILEY    2,202,020

PRINTING BLANKET

Filed Dec. 26, 1935

Inventor:
Stephen B. Neiley
By Theodore C. Browne
Attorney.

Patented May 28, 1940

2,202,020

UNITED STATES PATENT OFFICE 2,202,020

PRINTING BLANKET

Stephen B. Neiley, Winchester, Mass., assignor to Dewey and Almy Chemical Company, North Cambridge, Mass., a corporation of Massachusetts Application December 26, 1935, Serial No. 56,187

3 Claims. (Cl. 154—54.5)

This invention relates to a flexible backing for printing presses, particularly to such backings as are commonly designated "printer's blankets."

The blankets used in rotary press work and in textile printing differ in form and in the manner of use, but, essentially both cushion the line of pressure which is developed between the impression cylinder and the plate cylinder or engraved roll.

In letter press printing, the blankets are forced to withstand a punching action, since the type face is driven into the body of the blanket, but in offset and textile printing the pressure tends to build up a wave in the blanket which moves ahead of the cylinder carrying the work. The wave imposes a tremendous working upon the body of the blanket and, particularly on the heavy set work in textile printing or in printing from stereo plates (which are never absolutely accurate), the rubber is stressed beyond its elastic limits and soon breaks down. In letter-press printing, the working is more violent and localized in effect, but the same type of failure occurs.

It has been proposed to make printing blankets from impregnated felted stock in the hope that the felt fibers would reinforce the rubber and would prevent the destructive action of the moving pressure wave. In practice, however, the stress is so great that the fibers themselves are broken and such blankets soon become either cracked or corrugated. It has also been customary to reinforce the printing blanket with various hard woven textile fabrics upon which sheets of rubber have been calendered. Alternate layers of fabric and rubber have been plied up until a blanket of the desired thickness was produced, but, although it has been found that the textile threads reinforce the blanket to a material degree, the rubber layers are very severely worked and stressed. Such blankets tend to separate along the plies.

It is not possible to impregnate woven textile material with the high quality resilient rubber which it is necessary to place between the plies, consequently, the rubber is ineffectual in holding broken threads or strands in position. When frayed strands appear, the blanket must be discarded.

Figure 2:
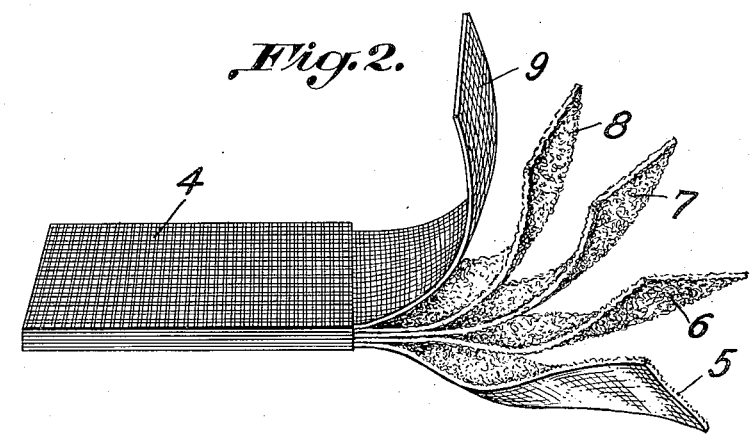
Figure 1:
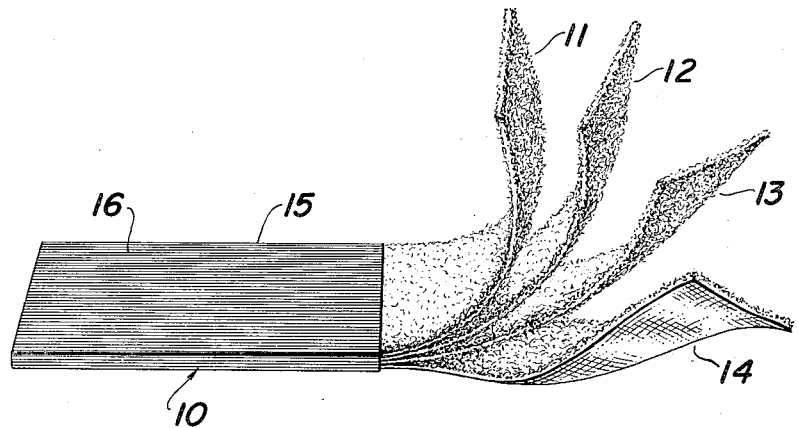
Figure 3:
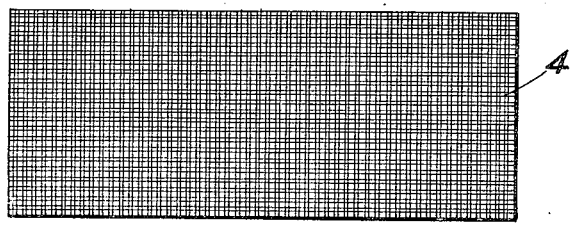

The objects of my present invention are to produce blankets having cushioning layers therein capable of absorbing and distributing the pressure disturbance over a larger area; to produce blankets having longer useful life; to provide a blanket having all textile components permanently embedded in rubber; to provide a blanket which may be used without back gray; and to provide a process by which such blankets may be manufactured easily. These and other objects will become apparent from the specification and from the drawing, in which Figure 1 is a perspective exploded view of the blanket; Figure 2 is a similar view of a modified blanket; and Figure 3 is a plan view of the printing surface of the blanket shown in Figure 2.

I have discovered that a printing blanket may be made from a number of plies of double napped textile fabric which, individually, have been impregnated in a latex solution containing a high percentage of rubber solids. Not only is the weave of the material very well saturated, but a very considerable amount of rubber is held in the nap. When several plies of this material are combined, the surface rubber of one ply unites with that of the next, forming an inseparable joint. The rubber at the joint is continuous throughout the weave and extends throughout the entire thickness of the blanket so that, in effect, a continuous rubber matrix is produced in which the fabric is embedded. Since the thickness and resiliency of the rubber at the joint is ample to withstand the heavy stresses developed by "heavy set" work, such blankets have a long useful life. Also, they are free from the difficulties which arise from frayed ends or loose threads since these are permanently bound in the rubber matrix and never work to the surface.

An additional advantage of this construction is that the very high rubber content permits a skived and cemented joint to be made while the blanket is on the machine. It is not necessary to make endless blankets. This represents a very considerable saving in textile printing.

I have found it advantageous to use for the back ply a fabric of single napped material. The weave is, therefore, brought close to the back surface of the blanket and, since the rubber is very tightly held therein, it does not scuff and pack on the drive rolls of textile printing machinery as is the case when a considerable mass or cushion of soft rubber is left at the back surface.

The printing surface of my blankets may be finished in a number of ways. If, as is usual in textile printing, the goods are to be printed against a "back gray" the surface which is left by the impregnation of a normal napped fabric is excellent. Small irregularities conforming to the weave of the goods appear, but since these are much smaller than the weave of the "back gray" no further attention need be given to the surface. In letter press or offset printing, however, a smooth surface is required; otherwise the color value of the printed sheet cannot be maintained. This I secure quite easily by curing the impregnated, plied mass between polished sheets in a normal vulcanizing press.

Certain textiles are printed without a "back gray" directly against the blanket. But, before the blanket can again pass under the goods and receive the impression it must be washed to remove the dye or ink which has struck through.

The ordinary woven cotton, wool napped, or flannel blankets, commonly used in textile printing, are entirely unsuited for this since they cannot be scrubbed. A rubber blanket which may be washed clean is necessary. In this method of printing, one function of the back gray which is to pick up and carry away a necessary excess of dye (which is driven through the printed goods) must be performed by the rubber blanket itself. Consequently, it has been proposed to form minute storage reservoirs in such a blanket by curing it in a press against a hard woven sheet which impresses its own design upon the surface of the rubber. In practice, however, it will be found that, although such blankets are suitable for light set work, in heavy set work, which is almost universally used in the production of the finest quality shirtings and print goods, the walls of these minute reservoirs are flattened down by the printing pressure and excess dye is not carried away.

By surfacing my improved blanket in the following manner, I am able to provide storage reservoirs for the excess dye which are not flattened even at the highest pressures and I secure excellent printing without the use of a "back gray."

The printing blanket is made in the manner which I have previously described, care being taken that the top layer contains such a large quantity of rubber that it will form practically a continuous surface film. I then apply a layer of sheeting which has been impregnated in the same latex solution to a sufficient degree to be entirely waterproof, but which does not carry sufficient rubber to fill up the insterstices between the threads. This, while still wet, is plied up on the base blanket.

A blanket so constructed has a permanent pore-containing surface which picks up and carries away any color which strikes through the goods. Even though very heavy sets are used, the textile weave of the surface ply cannot collapse and the cells remain unaffected and able to carry away the color.

Inasmuch as the surface ply is thoroughly waterproof and is bound to an impervious, waterproof layer, the color can easily be washed out and the blanket dried before it again must pass under the printing roll.

I have set forth two examples of the manners in which the surface of a printing blanket may be prepared to meet specific printing conditions. There are many others, for the conditions which a printing blanket must meet in use are very varied. For example, if the blanket is to be used for newspaper work, I coat the surface with polymers of ethylene sulphide which are insoluble in news inks, with oil resisting compounds such as polymerized chloroprene, or, I may provide a surface of especially compounded "oilproof" rubber. For other conditions, I have found it helpful to apply a sponge or microporous rubber surface layer.

*Examples*

As a specific example of the manner in which my improved blanket may be manufactured, four layers of double napped sheeting weighing 0.4 pound to the square yard of 34 x 43 construction are pulled into and through a latex impregnating bath. Each layer passes under a separate, spaced roller. The latex, which is compounded with sulphur and accelerators to cure at drying heat, contains 70% total solids.

As the individual plies of impregnated sheeting leave the bath they are combined and pass under a set of squeeze rolls adjusted to roll the plies into uniform contact and to leave, by squeezing out the excess compound, a final product having 70% rubber and 30% fiber in its make-up.

I have found it most desirable to utilize a coagulating substance for the latex which may be activated under precisely controlled conditions. Accordingly, and as I describe in my United States Reissue Patent No. 19,426, I incorporate in the latex compound a suitable proportion of a zinc-ammonium double salt and bring about coagulation by heating just as the blanket leaves the squeeze rolls. If the latex is not coagulated, it will be found extremely difficult to control the amount of rubber actually in the blanket, and it is well nigh impossible to control its distribution since the rubber particles otherwise always migrate towards the surface as latex dries. The sudden coagulation of latex in a fibrous mass, as is now well known, produces a mass of intertwined and connecting rubber tendrils which, generally, form without relation to the distribution of the fibers in the mass. On the other hand, latex which is merely dried tends to coat the individual fibers and to concentrate at their intersections. The independent structure of the rubber in the blanket imparts great strength and unusual adhesion of the plies. Coagulation also prevents the plies from slipping and blisters from forming as the blanket dries.

The wet blanket is passed over a can-dryer where it is dried and simultaneously cured. It is then calendered to 0.100" in thickness. Such a blanket is suitable for printing large designs where maximum resilience is demanded.

For the heavier set work, used in printing fine shirtings, three plies of double napped sheeting and one ply of single napped sheeting are impregnated and combined as before, and, after cure, calendered to 0.090" thick. The blanket is used with the rubber-filled napped surface towards the print roll and the unnapped surface towards the lapping.

Alternatively, the individual plies of fabric are impregnated with latex and are then dried and vulcanized. They are then coated with a latex cement on an ordinary doubling machine and built-up until a blanket of the proper thickness is obtained. The cement holds remarkably well, for the whole structure, being somewhat porous allows the cement to penetrate the blanket and to forms a bonding network which has proved to be very tenacious and strong.

In Figure 1 of the drawing, the blanket 10 is shown comprising the individual plies 11, 12 and 13 of napped fabric, and a single napped fabric back ply 14. The rubber matrix which embeds all plies is indicated at 15. The blanket is run with the surface 16 uppermost and receiving the impression. Figures 2 and 3 illustrate the modification in which the surface is formed by plying up a layer of impregnated sheeting 9 on the base blanket formed from the individual plies 5, 6, 7 and 8 to provide a multiplicity of storage reservoirs 4 for the excess dye.

The construction of my blanket is not necessarily confined to double napped goods. Single napped material may be used if the nap is thick enough. I have found that "broken-twill" is most suitable since this manner of weaving brings the filling to the surface in such a manner that a very heavy nap may be raised without weakening the warp. For extreme conditions, the warp may be made of linen, but for ordinary service, an all cotton, napped fabric of "broken-twill," weighing .73 pound per square yard of 84 x 64 construction, is very satisfactory.

The plies are treated and assembled exactly as before. A blanket made in this manner should be run with the napped side towards the plate cylinder.

Blankets, made in either of these manners have been used on heavy set work and have given long, satisfactory service. I believe that this is due to the mass of rubber surrounding each thread and fiber—to the separate rubber tendril structure which imparts unexpected strength, and—to the cushioning layer of rubber fibers and felt interposed between the plies. It seems probable, that the strains, instead of being localized, are spread out by the rubber over wider areas and, that the total strain, in consequence, more nearly approaches the permissible elastic limits of the blanket.

I claim:

1. A printer's blanket comprising a cushion base having a layer composed of a dye impervious rubber stratum and a rubber impregnated foraminous textile fabric superposed on said stratum and joined thereto throughout the whole extent of the exposed surface of said stratum to form a working surface, the foraminous structure of the textile fabric providing a multiplicity of surface indentations whereby storage areas for color are provided on the working surface.

2. A printer's blanket comprising a plurality of plies of textile fabric having napped surfaces, the individual plies being impregnated with rubber derived from latex sufficiently to impregnate the textile body and surround the napped fibers and form a rubber matrix reinforced by the fibers.

3. A printer's blanket in accordance with claim 2 having a rubber impregnated foraminous textile fabric superposed thereon and joined thereto throughout the whole extent of one surface of the blanket to form a working surface, the foraminuos structure of the textile fabric providing a multiplicity of surface indentations whereby storage areas for color are provided on the working surface.

STEPHEN B. NEILEY.